US011731688B2

(12) United States Patent  
Ehrhart et al.

(10) Patent No.: US 11,731,688 B2  
(45) Date of Patent: Aug. 22, 2023

(54) DIFFERENTIAL STEERING CONTROL VEHICLE, SYSTEM AND METHOD

(71) Applicant: CNH Industrial America LLC, New Holland, PA (US)

(72) Inventors: Philip J. Ehrhart, Narvon, PA (US); Madhu Pankaj, West Chester, PA (US); Robert L. Fackler, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 1087 days.

(21) Appl. No.: 16/430,467

(22) Filed: Jun. 4, 2019

(65) Prior Publication Data

US 2020/0385054 A1 Dec. 10, 2020

(51) Int. Cl.
*B62D 5/06* (2006.01)
*F04B 1/295* (2020.01)

(52) U.S. Cl.
CPC .............. *B62D 5/063* (2013.01); *F04B 1/295* (2013.01); *F04B 2203/09* (2013.01)

(58) Field of Classification Search
CPC .......... B62D 5/063; B62D 5/06; B62D 5/062; F04B 1/295; F04B 2203/09
See application file for complete search history.

(56) References Cited

U.S. PATENT DOCUMENTS

| | | | |
|---|---|---|---|
| 2,957,421 A * | 10/1960 | Mock | F04B 1/295 |
| | | | 417/269 |
| 4,558,593 A * | 12/1985 | Watanabe | F04B 49/065 |
| | | | 417/63 |
| 4,914,592 A | 4/1990 | Callahan et al. | |
| 7,798,272 B2 | 9/2010 | Pruitt et al. | |
| 7,930,843 B2 | 4/2011 | Hartwick | |
| 8,108,109 B2 | 1/2012 | Young et al. | |
| 9,668,419 B2 | 6/2017 | Soldan et al. | |
| 9,694,849 B2 | 7/2017 | Kuras et al. | |
| 9,763,384 B2 * | 9/2017 | Hessler | A01D 41/1274 |
| 10,058,031 B1 * | 8/2018 | Brown | B60K 17/356 |
| 11,053,929 B2 * | 7/2021 | Matsuo | F04B 1/2078 |
| 11,198,988 B1 * | 12/2021 | Zimmerman | F15B 11/17 |
| 11,492,783 B2 * | 11/2022 | Nishi | H04N 7/181 |
| 2005/0121249 A1 * | 6/2005 | Iwaki | B62D 7/18 |
| | | | 180/252 |
| 2005/0177291 A1 | 8/2005 | Strashny et al. | |
| 2007/0012014 A1 * | 1/2007 | Strasser | A01D 57/20 |
| | | | 56/10.2 R |
| 2009/0049833 A1 * | 2/2009 | Sakakura | B60K 17/043 |
| | | | 60/484 |

(Continued)

*Primary Examiner* — Kevin Hurley  
(74) *Attorney, Agent, or Firm* — Peter Zacharias (57) ABSTRACT

A method of differentially steering a hydraulically driven vehicle includes measuring left and right swash plate angles of pumps which drive left and right wheels of the vehicle and if the angles are different from one another and the larger swash plate angle is equal to or exceeds a threshold value then reducing the larger swash plate angle. If the larger swash plate angle is between the threshold value and a lower limit, or below the lower limit the swash plate angle is increased. Control systems and vehicles include swash plate angle sensors and actuators in communication with a controller which effects the steering control method.

20 Claims, 9 Drawing Sheets

(56) References Cited

U.S. PATENT DOCUMENTS

| | | | | |
|---|---|---|---|---|
| 2009/0071143 A1* | 3/2009 | Foster | ............... | F16H 61/47 |
| | | | | 60/327 |
| 2014/0169987 A1* | 6/2014 | Du | ............... | F04B 1/2078 |
| | | | | 417/222.1 |
| 2014/0379229 A1* | 12/2014 | Walz | ............... | E02F 3/964 |
| | | | | 701/50 |
| 2015/0004002 A1* | 1/2015 | Sowards | ............... | F04B 1/295 |
| | | | | 417/42 |
| 2015/0292499 A1* | 10/2015 | Heath, Jr. | ............... | F04B 1/295 |
| | | | | 417/222.1 |
| 2015/0308569 A1* | 10/2015 | Heath, Jr. | ............... | B62D 6/02 |
| | | | | 701/41 |
| 2016/0069309 A1* | 3/2016 | Takaoka | ............... | F02M 37/0047 |
| | | | | 123/468 |
| 2017/0268516 A1 | 9/2017 | Opperman et al. | | |
| 2020/0103023 A1* | 4/2020 | Hoegerle | ............... | F04B 1/324 |
| 2020/0164917 A1* | 5/2020 | Fay, II | ............... | B62D 5/06 |
| 2020/0248553 A1* | 8/2020 | Kharpas | ............... | F04B 1/295 |
| 2020/0256404 A1* | 8/2020 | Lyman, Jr. | ............... | F16D 31/02 |
| 2020/0332891 A1* | 10/2020 | Bender | ............... | F04B 49/065 |
| 2020/0385054 A1* | 12/2020 | Ehrhart | ............... | B62D 5/063 |
| 2021/0001923 A1* | 1/2021 | Fay, II | ............... | B60T 13/662 |
| 2021/0115910 A1* | 4/2021 | Draper | ............... | F04B 49/22 |
| 2021/0235621 A1* | 8/2021 | Pankaj | ............... | A01D 69/03 |

* cited by examiner

Reducing Said Right Swash Plate Angle When Reducing Said Left Swash Plate Angle

82

Reducing Said Left Swash Plate Angle When Reducing Said Right Swash Plate Angle

Increasing Said Right Swash Plate Angle When Reducing Said Left Swash Plate Angle

86

Increasing Said Left Swash Plate Angle When Reducing Said Right Swash Plate Angle

Said Right Swash Plate Angle is Increased in Direct Proportion to a Reduction in Said Left Swash Plate Angle

90

Said Left Swash Plate Angle is Increased in Direct Proportion to a Reduction in Said Right Swash Plate Angle

DIFFERENTIAL STEERING CONTROL VEHICLE, SYSTEM AND METHOD

FIELD OF THE INVENTION

This invention relates to differentially steered vehicles and control systems for effecting differential steering.

BACKGROUND

In prior art vehicles using differential steered tandem-pump ground drive hydraulic systems, vehicle steering is effected by increasing the swash plate angle on one pump while simultaneously decreasing the swash plate angle on the other pump. Provisions are usually made to prevent the pumps from reaching their maximum swash plate angles because such a situation would limit the amount of steering that could occur when the swash plate reaches the mechanical limit (full angular travel of the swash plate). Steering under such conditions results in a limited turning rate and radius, less than the vehicle's actual potential, as well as high mechanical stresses imposed on the pump mechanisms, perhaps leading to binding. A common method used to address this issue is to limit the swash plate angle of the pumps when not turning to something less than full stroke thereby providing swash plate headroom to allow for turning. However this method has the undesirable effect of reducing the top-end speed of the vehicle in each gear range and does not make full use of the pump range or efficiency of operation. There is clearly an opportunity to improve methods of steering differentially steered vehicles.

SUMMARY

The invention concerns a method of steering a vehicle having at least a left wheel and a right wheel oppositely disposed. To effect steering torque is applied to the left wheel by a left hydraulic pump having a left swash plate and torque is applied to the right wheel by a right hydraulic pump having a right swash plate. In one example embodiment the method comprises:
  measuring a left swash plate angle of the left swash plate;
  measuring a right swash plate angle of the right swash plate;
  comparing the left swash plate angle to the right swash plate angle;
  comparing the left swash plate angle to a left angle threshold if the left swash plate angle is greater than the right swash plate angle;
  comparing the right swash plate angle to a right angle threshold if the right swash plate angle is greater than the left swash plate angle;
  reducing the left swash plate angle if the left swash plate angle is equal to or greater than the left angle threshold;
  reducing the right swash plate angle if the right swash plate angle is equal to or greater than the right angle threshold; and
  repeating the measuring, comparing and reducing steps.
By way of example the method may further comprise:
  reducing the right swash plate angle when reducing the left swash plate angle; and
  reducing the left swash plate angle when reducing the right swash plate angle.
In another example the method may further comprise:
  increasing the right swash plate angle when reducing the left swash plate angle; and
  increasing the left swash plate angle when reducing the right swash plate angle.
An example of the method may include steps wherein:
  the right swash plate angle is increased in direct proportion to a reduction in the left swash plate angle; and
  the left swash plate angle is increased in direct proportion to a reduction in the right swash plate angle.
An example method may further comprise:
  comparing the left swash plate angle to a left angle lower limit if the left swash plate angle is greater than the right swash plate angle;
  comparing the right swash plate angle to a right angle lower limit if the right swash plate angle is greater than the left swash plate angle;
  increasing the left swash plate angle if the left swash plate angle is less than the left angle threshold but greater than the left angle lower limit;
  increasing the right swash plate angle if the right swash plate angle is less than the right angle threshold but greater than the right angle lower limit.
Another example method embodiment further comprises:
  comparing the left swash plate angle to a left angle lower limit if the left swash plate angle is greater than the right swash plate angle;
  comparing the right swash plate angle to a right angle lower limit if the right swash plate angle is greater than the left swash plate angle;
  increasing the left swash plate angle if the left swash plate angle is less than the left angle lower limit;
  increasing the right swash plate angle if the right swash plate angle is less than the right angle lower limit.
Another example embodiment of a method according to the invention may include steps wherein:
  the left swash plate angle is increased by a first amount if the left swash plate angle is less than the left angle threshold but greater than the left angle lower limit, and the left swash plate angle is increased by a second amount if the left swash plate angle is less than the left angle lower limit, the second amount being different from the first amount; and
  the right swash plate angle is increased by a third amount if the right swash plate angle is less than the right angle threshold but greater than the right angle lower limit, and the right swash plate angle is increased by a fourth amount if the right swash plate angle is less than the right angle lower limit, the third amount being different from the fourth amount.
In a particular example method the second amount is greater than the first amount and the third amount is greater than the fourth amount.
By way of example the method according to the invention may further comprise:
  determining a left reduction amount of the left swash plate angle;
  reducing the left swash plate angle by the left reduction amount if the left swash plate angle is equal to or greater than the left angle threshold.
An example method further comprises:
  determining a right reduction amount of the right swash plate angle;
  reducing the right swash plate angle by the right reduction amount if the right swash plate angle is equal to or greater than the right angle threshold.
In a specific example method, at least one of the left and the right reduction amounts are proportional to a parameter selected from the group consisting of a speed of the vehicle, a speed range of the vehicle, a swash plate angle and combinations thereof.

The invention further encompasses a control system for steering a vehicle having at least a left wheel and a right wheel oppositely disposed wherein torque is applied to the left wheel by a left hydraulic pump having a left swash plate and torque is applied to the right wheel by a right hydraulic pump having a right swash plate. One example embodiment of the control system according to the invention comprises a controller. A left swash plate sensor is in communication with the controller. The left swash plate sensor measures a left swash plate angle and sends signals indicative of the left swash plate angle to the controller. A right swash plate sensor is in communication with the controller. The right swash plate sensor measures a right swash plate angle and sends signals indicative of the right swash plate angle to the controller. A left swash plate actuator is in communication with the controller for adjusting a left swash plate angle of the left swash plate and a right swash plate actuator is in communication with the controller for adjusting a right swash plate angle of the right swash plate. In this example embodiment the controller is adapted to receive the signals indicative of the left and the right swash plate angles, compare the left and right swash plate angles with one another, and to adjust the left and right swash plate angles using the left and right swash plate actuators pursuant to a control method executed by the controller.

The invention further encompasses a control system for steering a vehicle having at least a left wheel and a right wheel oppositely disposed wherein torque si applied to the left wheel by a left hydraulic pump having a left swash plate and torque is applied to the right wheel by a right hydraulic pump having a right swash plate. By way of example the control system comprises a controller. A left swash plate sensor is in communication with the controller. The left swash plate sensor measures a left swash plate angle and sends signals indicative of the left swash plate angle to the controller. A right swash plate sensor is in communication with the controller. The right swash plate sensor measures a right swash plate angle and sends signals indicative of the right swash plate angle to the controller. At least one swash plate actuator is in communication with the controller for adjusting a left swash plate angle of the left swash plate and a right swash plate angle of the right swash plate. In this example embodiment the controller is adapted to receive the signals indicative of the left and the right swash plate angles, compare the left and right swash plate angles with one another, and to adjust the left and right swash plate angles using the at least one actuator pursuant to a control method executed by the controller.

The invention also encompasses a differentially steered vehicle. In one example embodiment the vehicle comprises a chassis having an engine and a plurality of wheels mounted thereon including a left wheel and a right wheel disposed on opposite sides of the vehicle. A left hydraulic motor is operatively associated with the left wheel and a right hydraulic motor is operatively associated with the right wheel. A left hydraulic pump is driven by the engine. The left hydraulic pump is operatively associated with the left hydraulic motor and has a left swash plate. A right hydraulic pump is driven by the engine. The right hydraulic pump is operatively associated with the right hydraulic motor and has a right swash plate. A controller is part of the vehicle. A left swash plate sensor is in communication with the controller, the left swash plate sensor measures a left swash plate angle and sends signals indicative of the left swash plate angle to the controller. A right swash plate sensor is in communication with the controller, the right swash plate sensor measures a right swash plate angle and sends signals indicative of the right swash plate angle to the controller. A left swash plate actuator is in communication with the controller for adjusting a left swash plate angle of the left swash plate and a right swash plate actuator is in communication with the controller for adjusting a right swash plate angle of the right swash plate. The controller is adapted to receive the signals indicative of the left and the right swash plate angles, compare the left and right swash plate angles with one another, and to adjust the left and right swash plate angles using the left and right swash plate actuators pursuant to a control method executed by the controller. In one example embodiment the vehicle comprises a tractor. In another example embodiment the vehicle comprises a harvester.

A differentially steered vehicle is also encompassed by the invention. In an example embodiment the vehicle comprises a chassis having an engine and a plurality of wheels mounted thereon including a left wheel and a right wheel disposed on opposite sides of the vehicle. A left hydraulic motor is operatively associated with the left wheel and a right hydraulic motor is operatively associated with the right wheel. A left hydraulic pump is driven by the engine. The left hydraulic pump is operatively associated with the left hydraulic motor and has a left swash plate. A right hydraulic pump is driven by the engine. The right hydraulic pump is operatively associated with the right hydraulic motor and has a right swash plate. A controller is part of the vehicle. A left swash plate sensor is in communication with the controller. The left swash plate sensor measures a left swash plate angle and sends signals indicative of the left swash plate angle to the controller. A right swash plate sensor is in communication with the controller. The right swash plate sensor measures a right swash plate angle and sends signals indicative of the right swash plate angle to the controller. At least one swash plate actuator is in communication with the controller for adjusting a left swash plate angle of the left swash plate and a right swash plate angle of the right swash plate. In this embodiment the controller is adapted to receive the signals indicative of the left and the right swash plate angles, compare the left and right swash plate angles with one another, and to adjust the left and right swash plate angles using the at least one actuator pursuant to a control method executed by the controller. In one example embodiment the vehicle comprises a tractor. In another example embodiment the vehicle comprises a harvester. By way of example the swash plate actuator may comprise a propulsion shaft common to the left and the right swash plates.

DETAILED DESCRIPTION

Figure 1:
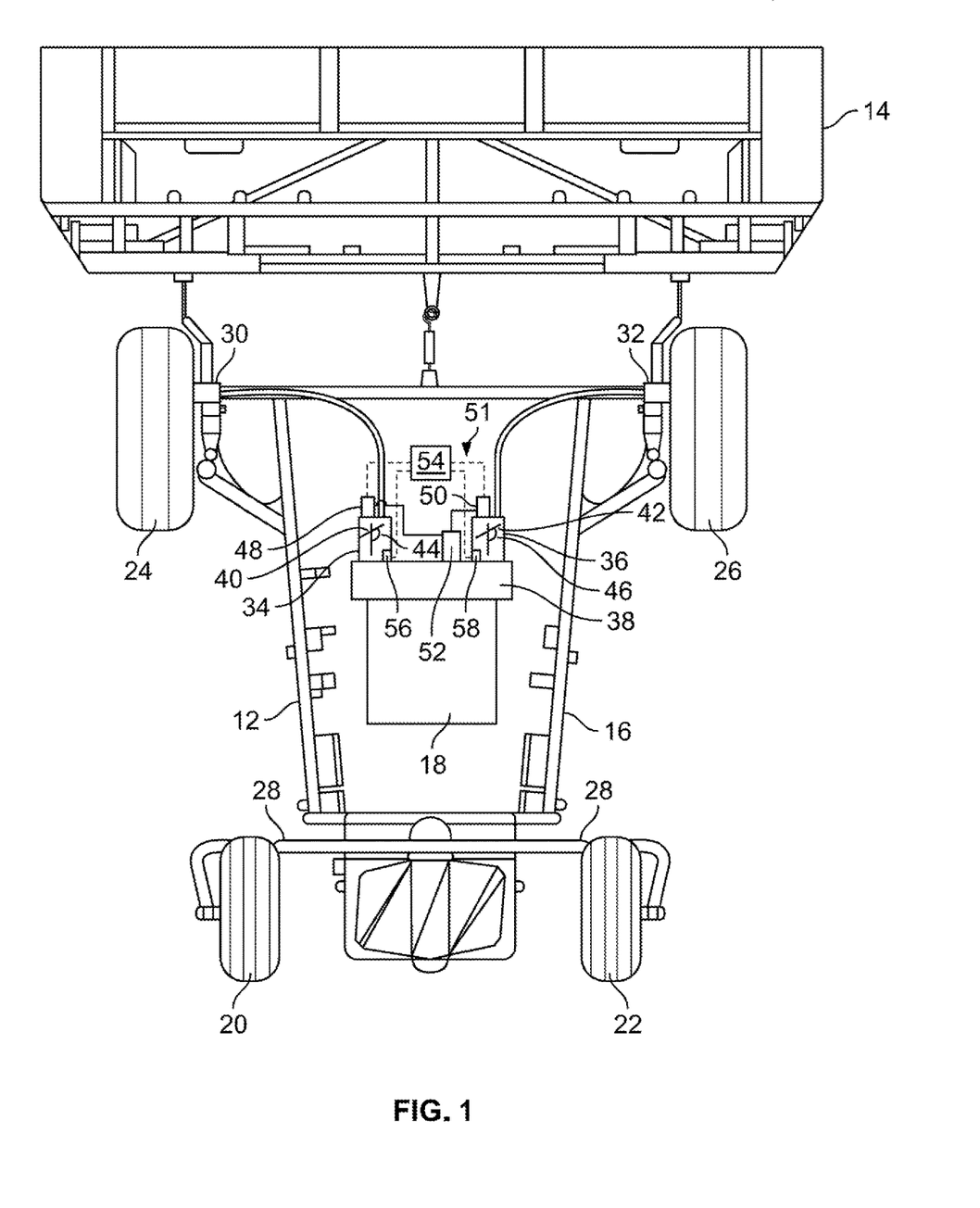
FIG. 1 shows a vehicle having an example differential steering system according to the invention.

FIG. 1 shows an example differentially steered vehicle 10 according to the invention. Vehicle 10 in this example is a harvester comprising a tractor 12 and a header 14 for cutting crops. It is understood that the invention encompasses other types of harvesters including self-propelled and towed windrowers, balers and combines and includes tracked as well as wheeled vehicles. Vehicle 10 comprises a chassis 16 on which an engine 18 is mounted. A plurality of wheels, in this example 4 wheels 20, 22, 24 and 26, are also mounted on chassis 16. Wheels 20 and 22 are free wheeling and caster about respective caster axes 28 to follow vehicle 10 as it turns. Wheels 24 (left wheel) and 26 (right wheel) are driven and have angularly fixed axles, steering being effected by applying different torque to one wheel than the other, the turn being in the direction of the wheel with less torque.

Torque is applied to the left wheel 24 by a left hydraulic motor 30 operatively associated with the left wheel, and torque is applied to the right wheel 26 by a right hydraulic motor 32 operatively associated with the right wheel, both motors mounted on the chassis 16. The left hydraulic motor 30 is driven by a left hydraulic pump 34 operatively associated with the left hydraulic motor and the right hydraulic motor 32 is driven by a right hydraulic pump 36 operatively associate with the right hydraulic motor. Both hydraulic pumps 34 and 36 are driven by engine 18 through a gear box 38 and may comprise axial piston pumps as in this example.

As is well understood, the output (pressure, volume rate of flow) from an axial piston pump is controlled by adjusting the angle of the pump's swash plate with respect to the pump shaft's axis of rotation. Larger swash plate angles produce greater pump output. Vehicle 10 comprises a left swash plate 40 in the left hydraulic pump 32 and a right swash plate 42 in the right hydraulic pump 36. The left swash plate 40 is adjustable through a left swash plate angle 44 and the right swash plate 42 is adjustable through a right swash plate angle 46. In this example embodiment the left swash plate angle 44 is adjusted by a left swash plate actuator 48 and the right swash plate angle 46 is adjusted by a right swash plate actuator 50. Actuators 48 and 50 may be hydraulic actuators as in this example, driven by an actuator pump 52 by engine 18 through gear box 38.

Vehicle 10 is steered differentially by adjusting the left and right swash plate angles 44 and 46 of the left and right hydraulic pumps 34 and 36. When the left and right swash plate angles are equal and both pumps 34 and 36 are driven at the same speed, equal torque will be applied to the left and right wheels 24 and 26 via their respective left and right hydraulic motors 30 and 32 and the vehicle 10 will move along a straight line, the speed being proportional to the swash plate angle, with greater swash plate angles producing higher speeds. To steer to the left the swash plate angles are adjusted with respect to one another so that the right swash plate angle 46 is greater than the left swash plate angle 44. More hydraulic oil flows to the right hydraulic motor 32 and thus more torque is applied to the right wheel 26 which causes the vehicle 10 to steer to the left. To steer to the right the swash plate angles are adjusted with respect to one another so that the left swash plate angle 44 is greater than the right swash plate angle 46. More hydraulic oil flows to the left hydraulic motor 30 and thus more torque is applied to the left wheel 24 which causes the vehicle 10 to steer to the right. The rate of turn is proportional to the difference between the left and right swash plate angles.

Vehicle 10 further comprises a control system 51. Control system 51 permits manual steering of vehicle 10 or differential steering according to a method, an example of which is described below. Control system 51 comprises a controller 54, for example a programmable logic controller or other microprocessor based computer mounted on chassis 16. Resident software on the controller provides the methods to execute the differential method of steering according to the invention. The controller 54 is in communication with a left swash plate sensor 56 and a right swash plate sensor 58. Communication between the controller and the sensors may be via wires or wirelessly via rf signals. Left swash plate sensor 56 is operatively associated with the left hydraulic pump 34, measures the left swash plate angle 44 and generates signals indicative of this angle which are communicated to the controller 54. Similarly, the right swash plate sensor 58 is operatively associated with the right hydraulic pump 36, measures the right swash plate angle 46 and generates signals indicative of this angle which are communicated to the controller 54. The swash plate actuators 48 and 50 are in communication with the controller 54. Communication between the controller and the actuators may be via wires or wirelessly via rf signals. Left swash plate actuator 48 is operatively associated with the left hydraulic pump 34 and operates to adjust the left swash plate angle 44 based upon signals sent to the actuator by the controller 54. Similarly, the right swash plate actuator 50 is operatively associated with the right hydraulic pump 36 and operates to adjust the right swash plate angle 46 based upon signals sent to the actuator by the controller 54. The controller 54 is adapted to receive the signals from the sensors 56 and 58 indicative of the left and right swash plate angles 44 and 46, compare the left and right swash plate angles with one another, and then adjust the left and right swash plate angles using the left and right swash plate actuators 48 and 50 pursuant to a control method executed by the controller 54 to control the turning of vehicle 10.

Figure 2:
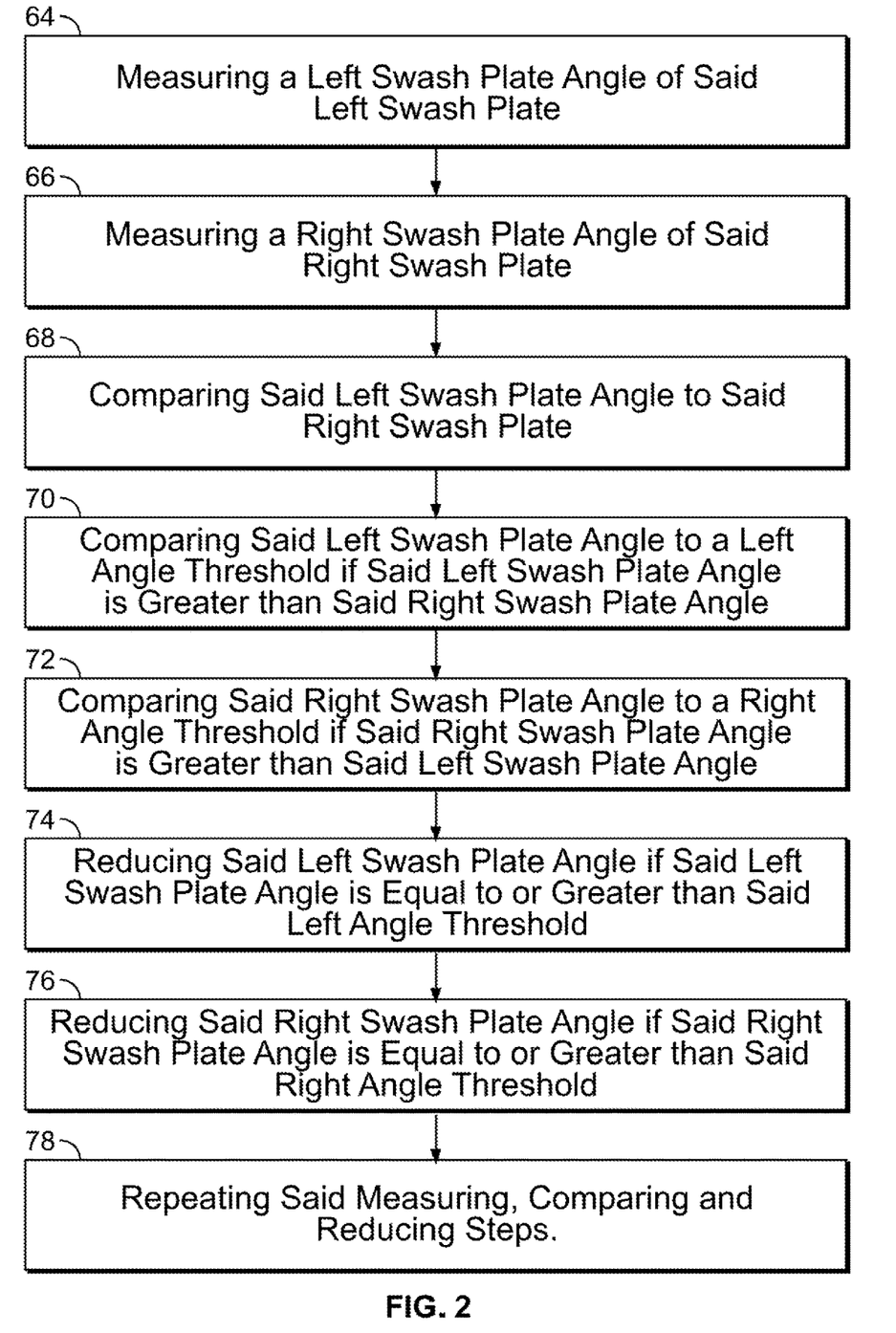
FIG. 2 is a flow chart depicting portions of an example method for differentially steering a vehicle.

As shown in FIGS. 1 and 2, an example embodiment of a method for differential steering of vehicle 10 comprises measuring a left swash plate angle 44 of the left swash plate 40 using the left swash plate sensor 56 (64) and measuring a right swash plate angle 46 of the right swash plate 42 using the right swash plate sensor 58 (66). The controller 54 compares the left swash plate angle 44 to the right swash plate angle 46 (68). If the left swash plate angle 44 is greater than the right swash plate angle 46 the controller 54 compares the left swash plate angle to a left angle threshold (70). If the right swash plate angle 46 is greater than the left swash plate angle 44 the controller 54 compares the right swash plate angle to a right angle threshold (72). If the left swash plate angle 44 is equal to or greater than the left angle threshold then the controller 54 uses the left swash plate actuator 48 to reduce the left swash plate angle 44 (74). If the right swash plate angle 46 is equal to or greater than the right angle threshold then the controller 54 uses the right swash plate actuator 46 to reduce the right swash plate angle 46 (76). The steps 64-76 are repeated (78) while the vehicle 10 operates under the method executed by the controller 54.

Figure 3:
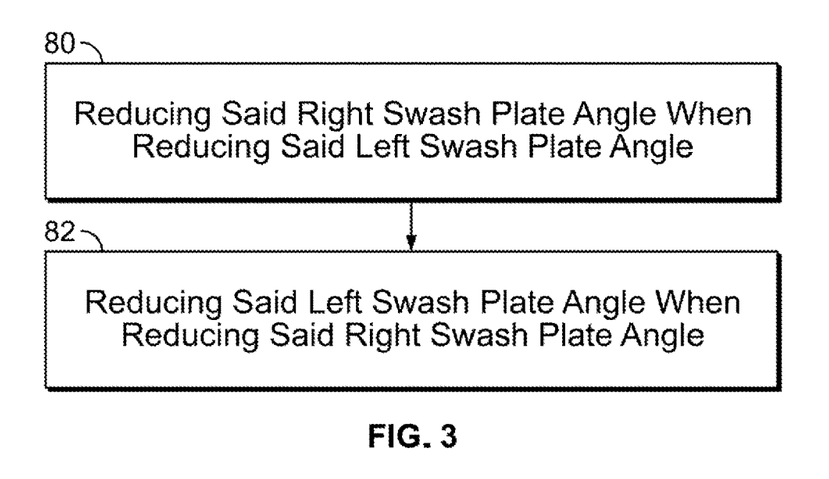
FIG. 3 is a flow chart depicting portions of an example method for differentially steering a vehicle.
Figure 4:
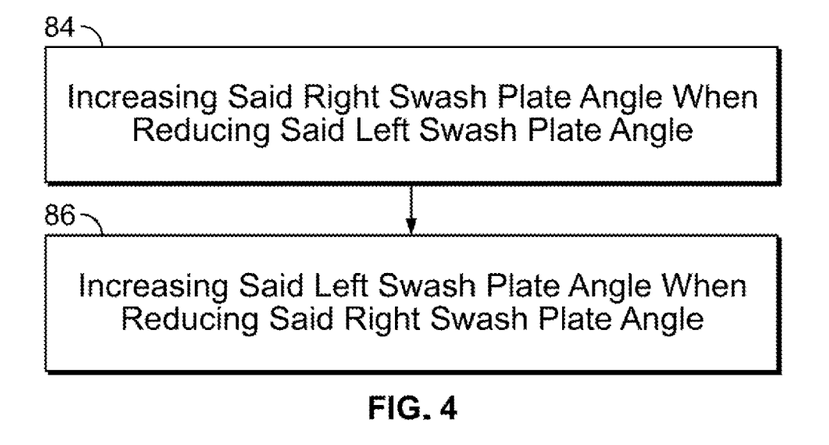
FIG. 4 is a flow chart depicting portions of an example method for differentially steering a vehicle.

As shown in FIGS. 1 and 3, the method may further comprise reducing the right swash plate angle 46 when reducing the left swash plate angle 44 (80), and reducing the left swash plate angle 44 when reducing the right swash plate angle 46 (82). FIGS. 1 and 4 show further steps according to the method comprising increasing the right swash plate angle 46 when reducing the left swash plate angle 44 (84) and increasing the left swash plate angle 44 when reducing the right swash plate angle 46 (86).

Figure 5:
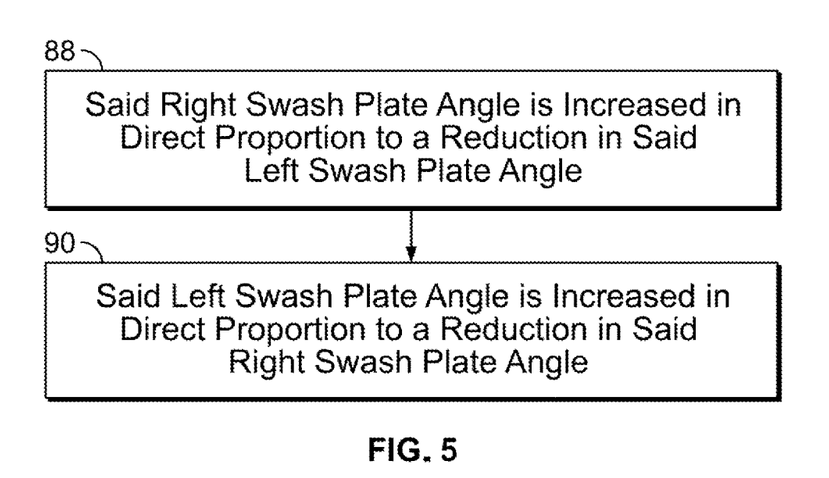
FIG. 5 is a flow chart depicting portions of an example method for differentially steering a vehicle.

As shown in FIG. 5, the method may also include increasing the right swash plate angle in direct proportion to a reduction in the left swash plate angle (88) and increasing the left swash plate angle in direct proportion to a reduction in the right swash plate angle (90).

Figure 6:
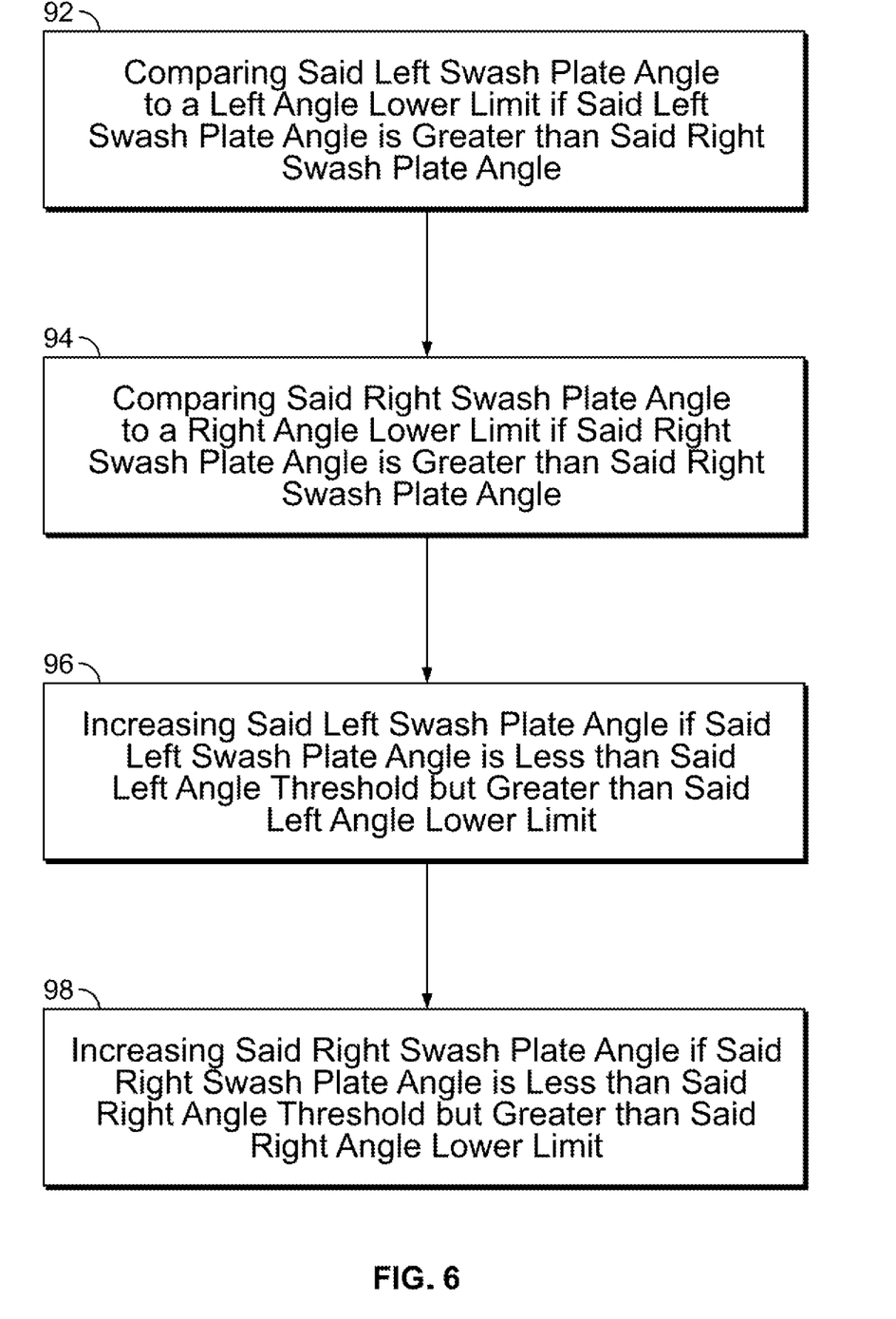
FIG. 6 is a flow chart depicting portions of an example method for differentially steering a vehicle.

A further example embodiment of a method according to the invention is shown in FIG. 6 and may comprise comparing the left swash plate angle to a left angle lower limit if the left swash plate angle is greater than the right swash plate angle (92), comparing the right swash plate angle to a right angle lower limit if the left swash plate angle is greater than the right swash plate angle (94), and increasing the left swash plate angle if the left swash plate angle is less than the left angle threshold but greater than the left angle lower limit (96), and increasing the right swash plate angle if the right swash plate angle is less than the right angle threshold but greater than the right angle lower limit (98).

Figure 7:
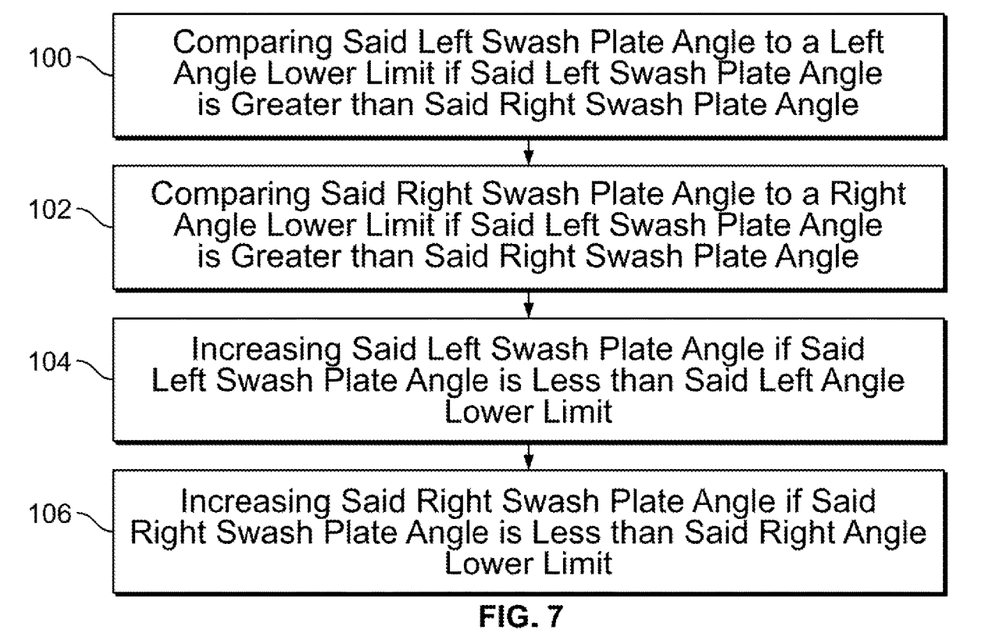
FIG. 7 is a flow chart depicting portions of an example method for differentially steering a vehicle.

FIG. 7 shows additional steps according to an embodiment of the method comprising comparing the left swash plate angle to a left angle lower limit if the left swash plate angle is greater than the right swash plate angle (100) and comparing the right swash plate angle to a right angle lower limit if the left swash plate angle is greater than the right swash plate angle (102). If the left swash plate angle is less than the left angle lower limit then the left swash plate angle is increased (104) and if the right swash plate angle is less than the right angle lower limit the right swash plate angle is increased (106).

Figure 8:
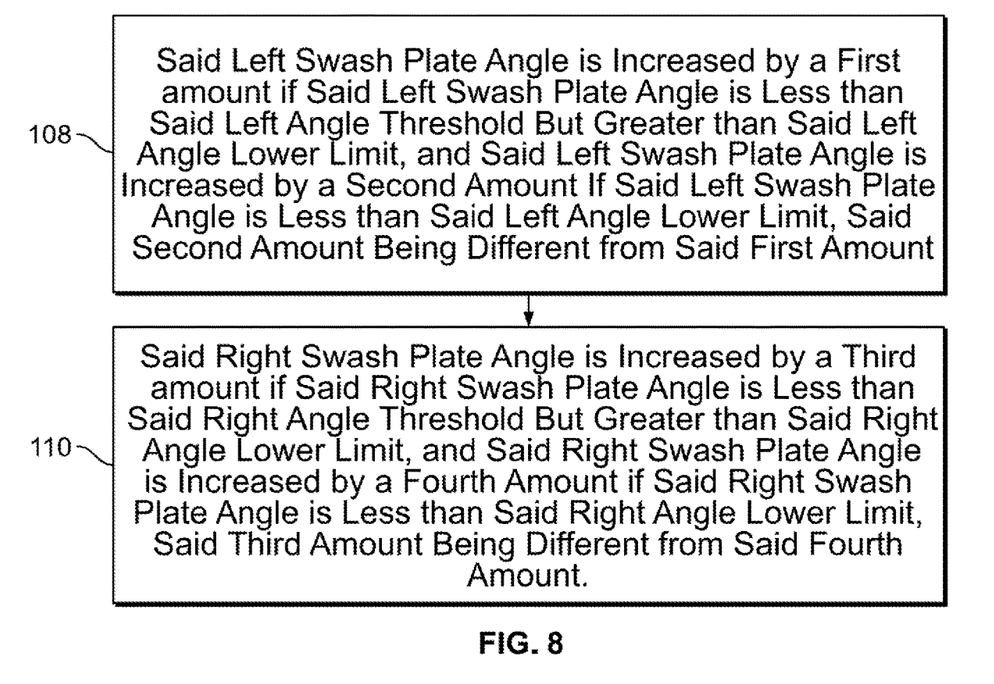
FIG. 8 is a flow chart depicting portions of an example method for differentially steering a vehicle.

FIG. 8 shows additional method steps wherein the left swash plate angle is increased by a first amount if the left swash plate angle is less than the left angle threshold but greater than the left angle lower limit, and the left swash plate angle is increased by a second amount if the left swash plate angle is less than the left angle lower limit, the second amount being different from the first amount (108) and the right swash plate angle is increased by a third amount if the right swash plate angle is less than the right angle threshold but greater than the right angle lower limit, and the right swash plate angle is increased by a fourth amount if the right swash plate angle is less than the right angle lower limit, the third amount being different from the fourth amount (110). In a particular example embodiment the second amount is greater than the first amount and the third amount is greater than the fourth amount.

Figure 9:
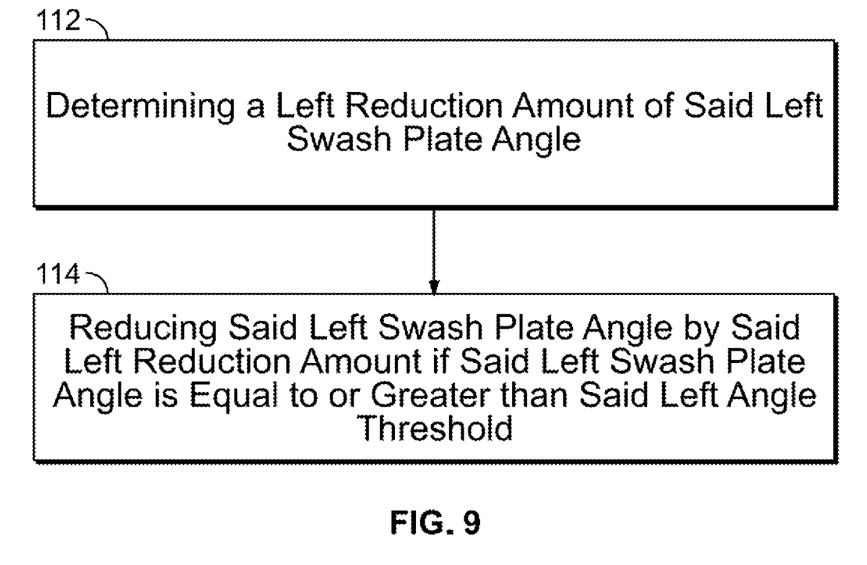
FIG. 9 is a flow chart depicting portions of an example method for differentially steering a vehicle.

FIG. 9 shows additional method steps of determining a left reduction amount of the left swash plate angle (112) and reducing the left swash plate angle by the left reduction amount if the left swash plate angle is equal to or greater than the left angle threshold (114).

Figure 10:
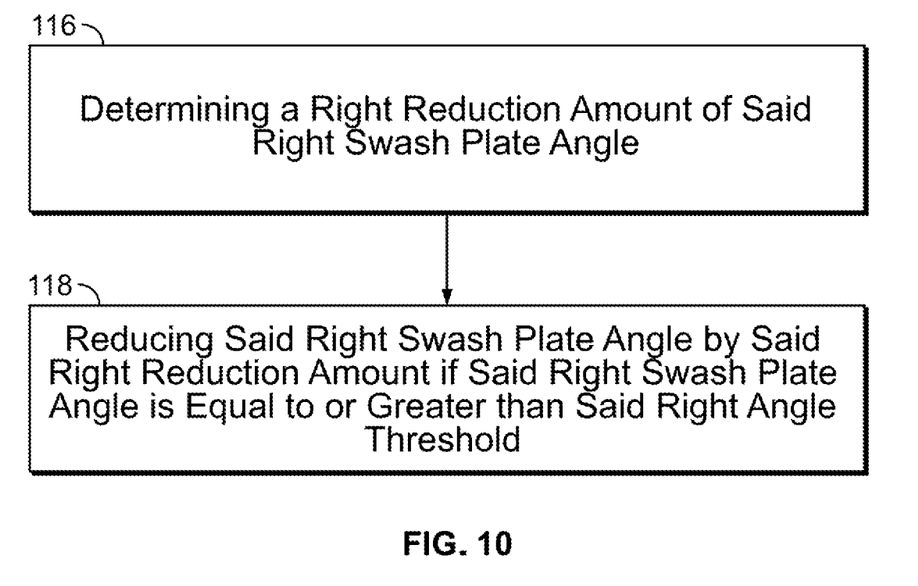
FIG. 10 is a flow chart depicting portions of an example method for differentially steering a vehicle.

Method steps shown in FIG. 10 include determining a right reduction amount of the right swash plate angle (116) and reducing the right swash plate angle by the right reduction amount if the right swash plate angle is equal to or greater than the right angle threshold (118). In an example embodiment at least one of the left and the right reduction amounts are proportional to a parameter selected from the group consisting of a speed of the vehicle, a speed range of the vehicle, a swash plate angle and combinations thereof.

Figure 11:
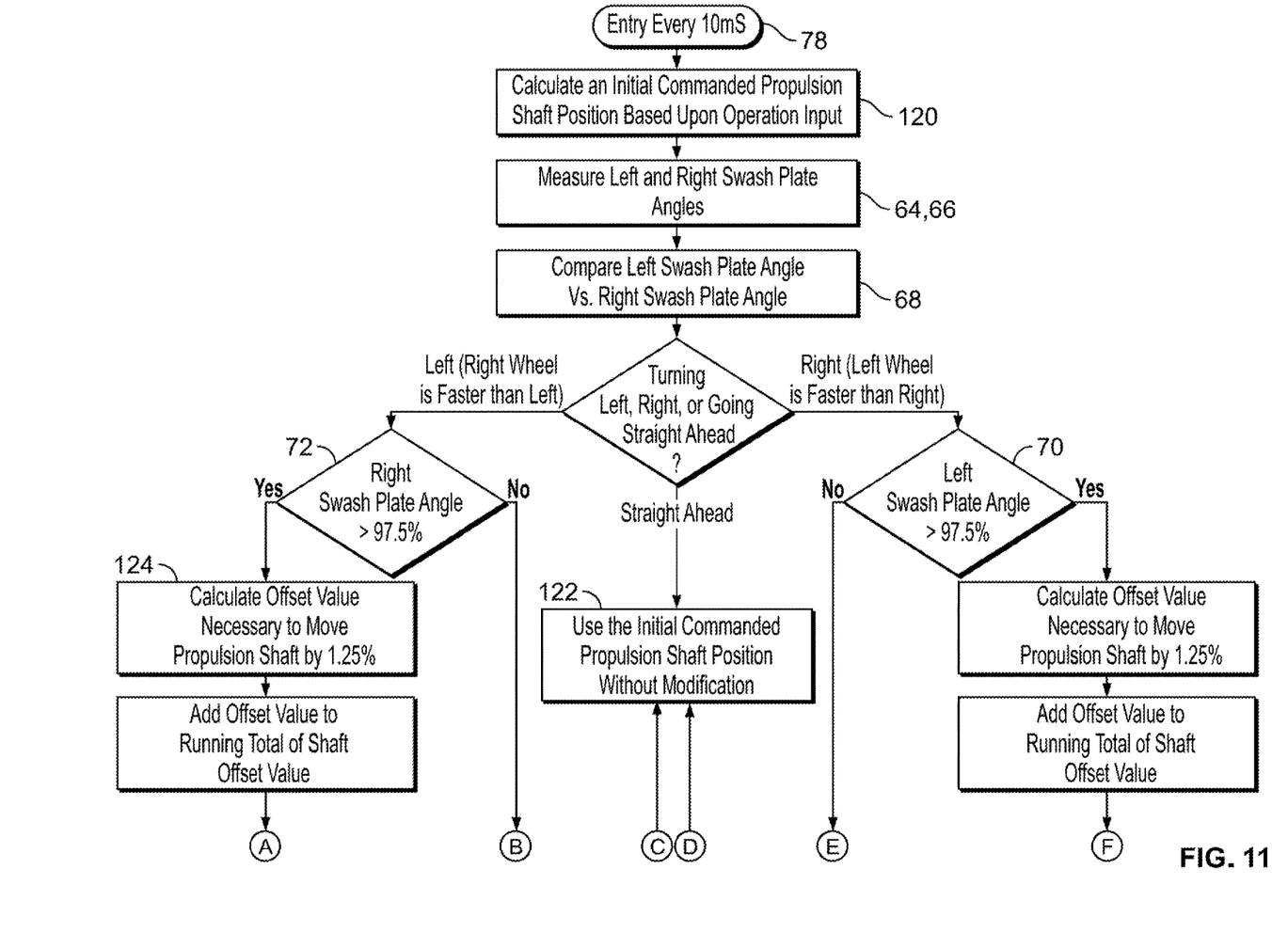
FIG. 11 is a flow chart depicting an implementation of an example method for differentially steering a vehicle according to the invention.

FIG. 11 shows a flow chart illustrating a practical implementation of an example method for differential steering of a vehicle according to the invention. As indicated at 78, the steps of the method are repeated periodically, in this example every 10 milliseconds. At 120, the vehicle is being driven by an operator via controls which affect the angular positions of the left and right swash plates 40 and 42 (see also FIG. 1) to control the speed and direction of vehicle 10. The "propulsion shaft position" refers to the operation of the left and right swash plate actuators 48 and 50. When the operator invokes steering by the method according to the invention the controller measures the swash plate angles (64, 66) and compares them against one another. If the angles are equal the vehicle is moving in a straight line and the steering method is not used; the propulsion shaft position (actuator positions) of the operator are used to guide the vehicle (122). When the operator initiates a turn, for example, to the left, the swash plate angle measurements (64, 66) and comparison (68) executed by the controller indicate a right swash plate angle greater than the left swash plate angle, and the control method proceeds down the left branch of the flow chart starting at 72, where the right swash plate angle is compared with a threshold value, in this example, a percentage of the total permitted angle (97.5% being the example value). If the right swash plate angle exceeds the threshold it is reduced (76) by an amount calculated to move the propulsion shaft by a percentage (124), 1.25% being the example value. However, if the right swash plate angle does not exceed the threshold value, then it is compared with a right angle lower limit (94), in this example 94%. If the right swash plate angle is between the lower limit and the threshold, then the propulsion shaft is moved to increase the right swash plate angle by a calculated value (119, 98), in this example 0.5%; if the right swash plate angle is less than the lower limit, then the propulsion shaft is moved to increase the right swash plate angle by another calculated amount (110, 106), in this example 1%, which is greater than if the swash plate angle was between the lower limit and the threshold value. The right half of the flow chart illustrates similar steps for controlling a right turn according to the method.

The control method according to the invention uses sensors 56 and 58 to measure the swash plate angles 44 and 46 of each pump 34 and 36 and control the swash plate angles to prevent them from reaching their mechanical limit (full stroke). The various parameters are selected to ensure that the desired steering action is achieved. The method detects when the vehicle 10 is turned and if a swash plate angle is approaching its limit. The method reduces the swash plate angle of one or both pumps to prevent reaching the mechanical limit. If the vehicle's rate of turn is increased (smaller turning radius) the method keeps reducing the swash angle so that the mechanical limit is not reached while simultaneously ensuring that the turning range is not limited. During tight turns the ground speed of the vehicle will be reduced which increases turning torque and results in more positive steering.

Figure 1A:
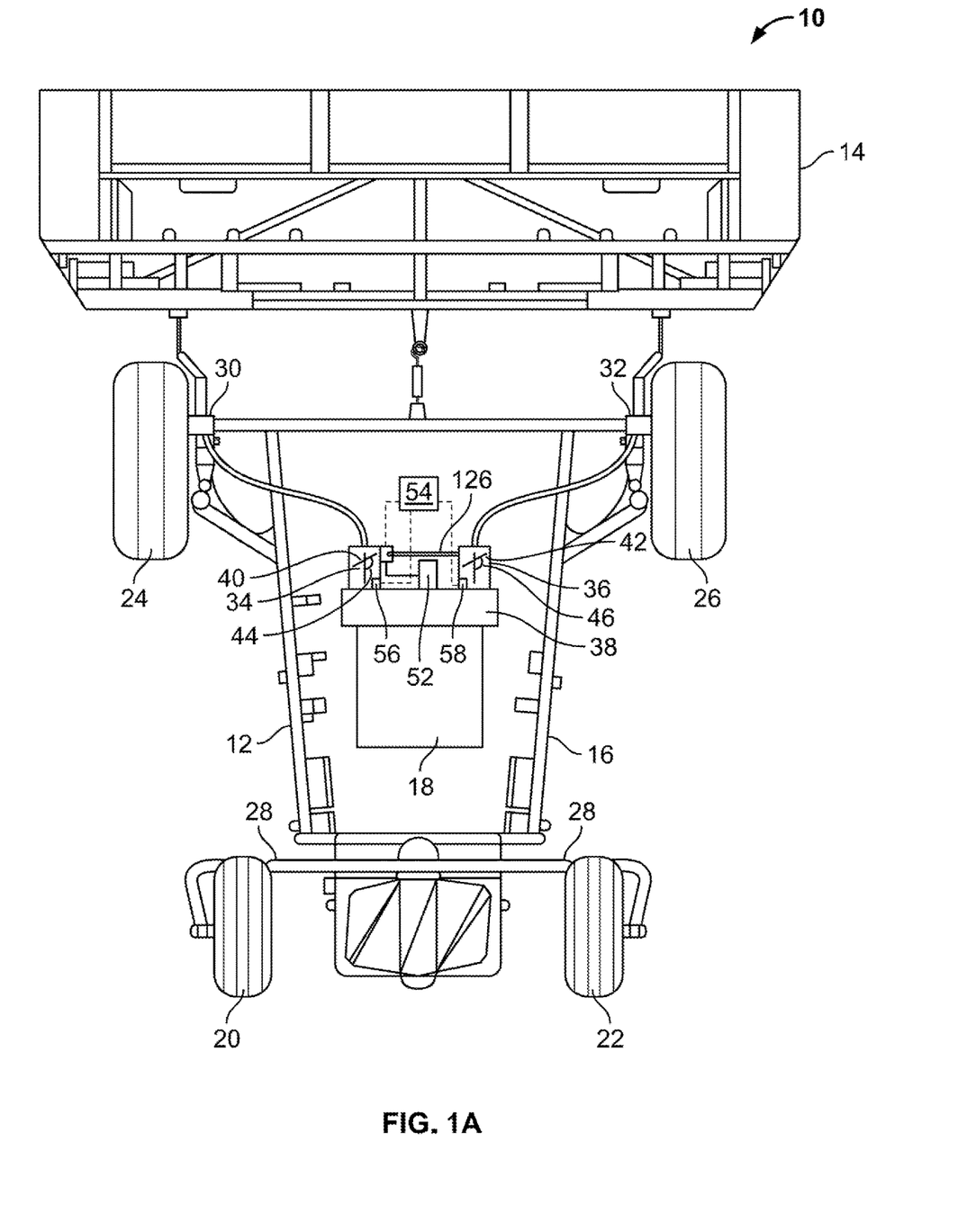
FIG. 1A shows a vehicle having another example embodiment of a differential steering system according to the invention.

When the vehicle is turned back the opposite direction the control method will restore the swash plate angle to its original position. This control method is applicable anytime when the machine is turned hard enough to advance the swash plate of the pump into the region approaching the mechanical limit. For example, if the pumps are at 75% of their maximum displacement when traveling in a straight line, a slight turn would not displace the swash plate far enough to approach the mechanical limit, whereas a hard turn would and the control method would be invoked. This method can be equally applicable to systems, as illustrated in FIG. 1, where the pump controls are purely electronic and without mechanical coupling (i.e. steer-by-wire). In the example embodiment shown in FIG. 1A, where the steering differential is achieved via a mechanical coupling such as a common actuator and propulsion shaft 126 between the two pumps 34 and 36, the control method can control the position of the common propulsion shaft and the swash plate angle of the pumps will be reduced or increased in unison. In the case of purely electronic control the pumps could be controlled to act in unison or independently using other criteria such as the vehicle speed at the time, the selected speed range, or other factors.

Control systems and methods according to the invention are expected to realize various advantages, for example: increased top end vehicle speed (no need to leave swash plate headroom), increased turning ability, increased turning torque for more positive steering as well as decreased stress and strain on pump and ground drive components because hitting the mechanical stop is prevented.

What is claimed is:

1. A method of steering a vehicle having at least a left wheel and a right wheel oppositely disposed, torque being applied to said left wheel by a left hydraulic pump having a left swash plate, torque being applied to said right wheel by a right hydraulic pump having a right swash plate, said method comprising:
   measuring a left swash plate angle of said left swash plate;
   measuring a right swash plate angle of said right swash plate;
   comparing said left swash plate angle to said right swash plate angle;
   comparing said left swash plate angle to a left angle threshold if said left swash plate angle is greater than said right swash plate angle;
   comparing said right swash plate angle to a right angle threshold if said right swash plate angle is greater than said left swash plate angle;
   reducing said left swash plate angle if said left swash plate angle is equal to or greater than said left angle threshold;
   reducing said right swash plate angle if said right swash plate angle is equal to or greater than said right angle threshold; and
   repeating said measuring, comparing and reducing steps.

2. The method according to claim 1, further comprising:
   reducing said right swash plate angle when reducing said left swash plate angle; and
   reducing said left swash plate angle when reducing said right swash plate angle.

3. The method according to claim 1, further comprising:
   increasing said right swash plate angle when reducing said left swash plate angle; and
   increasing said left swash plate angle when reducing said right swash plate angle.

4. The method according to claim 3, wherein:
   said right swash plate angle is increased in direct proportion to a reduction in said left swash plate angle; and
   said left swash plate angle is increased in direct proportion to a reduction in said right swash plate angle.

5. The method according to claim 1, further comprising:
   comparing said left swash plate angle to a left angle lower limit if said left swash plate angle is greater than said right swash plate angle;
   comparing said right swash plate angle to a right angle lower limit if said right swash plate angle is greater than said left swash plate angle;
   increasing said left swash plate angle if said left swash plate angle is less than said left angle threshold but greater than said left angle lower limit; and
   increasing said right swash plate angle if said right swash plate angle is less than said right angle threshold but greater than said right angle lower limit.

6. The method according to claim 5, further comprising:
   increasing said left swash plate angle if said left swash plate angle is less than said left angle lower limit; and
   increasing said right swash plate angle if said right swash plate angle is less than said right angle lower limit.

7. The method according to claim 6, wherein:
   said left swash plate angle is increased by a first amount if said left swash plate angle is less than said left angle threshold but greater than said left angle lower limit, and said left swash plate angle is increased by a second amount if said left swash plate angle is less than said left angle lower limit, said second amount being different from said first amount; and
   said right swash plate angle is increased by a third amount if said right swash plate angle is less than said right angle threshold but greater than said right angle lower limit, and said right swash plate angle is increased by a fourth amount if said right swash plate angle is less than said right angle lower limit, said third amount being different from said fourth amount.

8. The method according to claim 7, wherein said second amount is greater than said first amount and said third amount is greater than said fourth amount.

9. The method according to claim 1, further comprising:
   determining a left reduction amount of said left swash plate angle; and
   reducing said left swash plate angle by said left reduction amount if said left swash plate angle is equal to or greater than said left angle threshold.

10. The method according to claim 9, further comprising:
    determining a right reduction amount of said right swash plate angle; and
    reducing said right swash plate angle by said right reduction amount if said right swash plate angle is equal to or greater than said right angle threshold.

11. The method according to claim 10, wherein at least one of said left and said right reduction amounts are proportional to a parameter selected from the group consisting of a speed of said vehicle, a speed range of said vehicle, a swash plate angle and combinations thereof.

12. A control system for steering a vehicle having at least a left wheel and a right wheel oppositely disposed, torque being applied to said left wheel by a left hydraulic pump having a left swash plate, torque being applied to said right wheel by a right hydraulic pump having a right swash plate, said control system comprising:
    a controller;
    a left swash plate sensor in communication with said controller, said left swash plate sensor for measuring a left swash plate angle and sending signals indicative of said left swash plate angle to said controller;
    a right swash plate sensor in communication with said controller, said right swash plate sensor for measuring a right swash plate angle and sending signals indicative of said right swash plate angle to said controller;
    a left swash plate actuator in communication with said controller for adjusting said left swash plate angle of said left swash plate; and a right swash plate actuator in communication with said controller for adjusting said right swash plate angle of said right swash plate; wherein
said controller having programmed instructions to:
compare said left and right swash plate angles with one another;
compare said left swash plate angle to a left angle lower limit in response to a determination that said left swash plate angle is greater than said right swash plate angle;
compare said right swash plate angle to a right angle lower limit in response to a determination that said right swash plate angle is greater than said left swash plate angle;
control said left swash plate actuator to increase said left swash plate angle in response to a determination that said left swash plate angle is less than said left angle lower limit; and
control said right swash plate actuator to increase said right swash plate angle in response to a determination that said right swash plate angle is less than said right angle lower limit.

13. A control system for steering a vehicle having at least a left wheel and a right wheel oppositely disposed, torque being applied to said left wheel by a left hydraulic pump having a left swash plate, torque being applied to said right wheel by a right hydraulic pump having a right swash plate, said control system comprising:
a controller;
a left swash plate sensor in communication with said controller, said left swash plate sensor for measuring a left swash plate angle and sending signals indicative of said left swash plate angle to said controller;
a right swash plate sensor in communication with said controller, said right swash plate sensor for measuring a right swash plate angle and sending signals indicative of said right swash plate angle to said controller; and
at least one swash plate actuator in communication with said controller for adjusting said left swash plate angle of said left swash plate and said right swash plate angle of said right swash plate; wherein
said controller having programmed instructions to:
compare said left and right swash plate angles with one another;
compare said left swash plate angle to a left angle threshold in response to a determination that said left swash plate angle is greater than said right swash plate angle;
compare said right swash plate angle to a right angle threshold in response to a determination that said right swash plate angle is greater than said left swash plate angle;
control said at least one swash plate actuator to reduce said left swash plate angle in response to a determination that said left swash plate angle is greater than said left angle threshold; and
control said at least one swash plate actuator to reduce said right swash plate angle in response to a determination that said right swash plate angle is greater than said right angle threshold.

14. A differentially steered vehicle, said vehicle comprising:
a chassis having an engine and a plurality of wheels mounted thereon including a left wheel and a right wheel disposed on opposite sides of said vehicle;
a left hydraulic motor operatively associated with said left wheel;
a right hydraulic motor operatively associated with said right wheel;
a left hydraulic pump driven by said engine, said left hydraulic pump operatively associated with said left hydraulic motor and having a left swash plate;
a right hydraulic pump driven by said engine, said right hydraulic pump operatively associated with said right hydraulic motor and having a right swash plate;
a controller;
a left swash plate sensor in communication with said controller, said left swash plate sensor for measuring a left swash plate angle and sending signals indicative of said left swash plate angle to said controller;
a right swash plate sensor in communication with said controller, said right swash plate sensor for measuring a right swash plate angle and sending signals indicative of said right swash plate angle to said controller;
a left swash plate actuator in communication with said controller for adjusting said left swash plate angle of said left swash plate; and
a right swash plate actuator in communication with said controller for adjusting said right swash plate angle of said right swash plate; wherein
said controller having programmed instructions to:
compare said left swash plate angle to a left angle threshold in response to a determination that said left swash plate angle is greater than said right swash plate angle;
compare said right swash plate angle to a right angle threshold in response to a determination that said right swash plate angle is greater than said left swash plate angle;
control said left swash plate actuator to reduce said left swash plate angle in response to a determination that said left swash plate angle is greater than said left angle threshold; and
control said right swash plate actuator to reduce said right swash plate angle in response to a determination that said right swash plate angle is greater than said right angle threshold.

15. The vehicle according to claim 14, wherein said vehicle comprises a tractor.

16. The vehicle according to claim 14, wherein said vehicle comprises a harvester.

17. A differentially steered vehicle, said vehicle comprising:
a chassis having an engine and a plurality of wheels mounted thereon including a left wheel and a right wheel disposed on opposite sides of said vehicle;
a left hydraulic motor operatively associated with said left wheel;
a right hydraulic motor operatively associated with said right wheel;
a left hydraulic pump driven by said engine, said left hydraulic pump operatively associated with said left hydraulic motor and having a left swash plate;
a right hydraulic pump driven by said engine, said right hydraulic pump operatively associated with said right hydraulic motor and having a right swash plate;
a controller;
a left swash plate sensor in communication with said controller, said left swash plate sensor for measuring a left swash plate angle and sending signals indicative of said left swash plate angle to said controller;
a right swash plate sensor in communication with said controller, said right swash plate sensor for measuring a right swash plate angle and sending signals indicative of said right swash plate angle to said controller; and at least one swash plate actuator in communication with said controller for adjusting said left swash plate angle of said left swash plate and said right swash plate angle of said right swash plate; wherein said controller having programmed instructions to:

compare said left swash plate angle to a left angle threshold in response to a determination that said left swash plate angle is greater than said right swash plate angle;

compare said right swash plate angle to a right angle threshold in response to a determination that said right swash plate angle is greater than said left swash plate angle;

control said at least one swash plate actuator to increase said left swash plate angle in response to a determination that said left swash plate angle is less than said left angle threshold; and control said at least one swash plate actuator to increase said right swash plate angle in response to a determination that said right swash plate angle is less than said right angle threshold.

18. The vehicle according to claim 17, wherein said vehicle comprises a tractor.

19. The vehicle according to claim 17, wherein said vehicle comprises a harvester.

20. The vehicle according to claim 17, wherein said at least one swash plate actuator comprises a propulsion shaft common to said left and said right swash plates.

* * * * *